(12) United States Patent
Muppirala et al.

(10) Patent No.: US 9,389,921 B2
(45) Date of Patent: Jul. 12, 2016

(54) SYSTEM AND METHOD FOR FLEXIBLE DEVICE DRIVER RESOURCE ALLOCATION

(75) Inventors: Kishore Kumar Muppirala, Karnataka (IN); Narayanan Ananthakrishnan Nellayi, Karnataka (IN); Vijay Vishwanath Hegde, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 2339 days.

(21) Appl. No.: 12/334,552

(22) Filed: Dec. 15, 2008

(65) Prior Publication Data
US 2009/0183183 A1 Jul. 16, 2009

(30) Foreign Application Priority Data

Jan. 14, 2008 (IN) .............................. 133/CHE/2008

(51) Int. Cl.
*G06F 9/50* (2006.01)
*G06F 9/44* (2006.01)
*G06F 9/46* (2006.01)

(52) U.S. Cl.
CPC ............ *G06F 9/5061* (2013.01); *G06F 9/4411* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 5,541,912 A | 7/1996 | Choudhury et al. | |
| 5,996,013 A | 11/1999 | Delp et al. | |
| 6,047,356 A | 4/2000 | Anderson et al. | |
| 6,456,590 B1 | 9/2002 | Ren et al. | |
| 6,625,709 B2 | 9/2003 | Aiken et al. | |
| 6,704,877 B2 * | 3/2004 | Cline et al. | 713/320 |
| 6,732,232 B2 | 5/2004 | Krishnamurthy | |
| 6,898,686 B1 | 5/2005 | Perez | |
| 7,254,813 B2 | 8/2007 | Leong et al. | |
| 7,673,189 B2 * | 3/2010 | Duyanovich et al. | 714/47.1 |
| 7,694,100 B2 * | 4/2010 | Shah et al. | 711/170 |
| 2006/0095610 A1 | 5/2006 | Arndt et al. | |

* cited by examiner

*Primary Examiner* — H S Sough
*Assistant Examiner* — Kimberly Jordan
(74) *Attorney, Agent, or Firm* — Trop, Pruner & Hu, P.C.

(57) ABSTRACT

A system and method for flexible device driver resource allocation is disclosed. In one embodiment, a method for allocating device driver resources in a data processing system includes statically allocating hardware resource pools to device drivers on a rigid basis during initialization of the data processing system, and dynamically altering the allocated hardware resource pools to the device drivers based on parameters associated with utilization of the allocated hardware resource pools during run-time.

16 Claims, 3 Drawing Sheets

SYSTEM AND METHOD FOR FLEXIBLE DEVICE DRIVER RESOURCE ALLOCATION

RELATED APPLICATIONS

Benefit is claimed under 35 U.S.C. 119(a)-(d) to Foreign application Serial No. 133/CHE/2008 entitled "SYSTEM AND METHOD FOR FLEXIBLE DEVICE DRIVER RESOURCE ALLOCATION" by Hewlett-Packard Development Company, L.P., filed on 14 Jan. 2008, which is herein incorporated in its entirety by reference for all purposes.

BACKGROUND

Device drivers are kernel modules that interact with peripheral hardware and their controllers. Device drivers traditionally are pluggable or independently developable modules of an operating system (OS). Typically, device drivers have two pools of data structures that they create and manage. The first, referred to as OS interface pool, comprises queues/interfaces that are employed to interact with other layers/modules of the kernel. The second, referred to as hardware interface pool, comprises queues/data structures shared between the device driver and the hardware.

Typically, the size of the OS and hardware interface pools used by a device driver is pre-decided during the design stage (and validated during the testing phase). The device drivers are designed to start with fixed/pre-allocated shared memory resources for the above two pools of data structures during initialization phase-during system boot-up or when the driver is dynamically loaded for the first time—where the device drivers are associated with the hardware they are managing/controlling. It is possible for the device drivers to aggregate the respective OS interface pools into a single pool. These shared memory resources (or shared pool entries) are used on a first come first serve basis by the device drivers that manage similar hardware or protocol. Aggregation of hardware resource pools across different device drivers may be difficult as the current hardware may not be able to deal with scattered data structures as their input/output (I/O) queues/pools.

Typically, pool sizes are determined based on benchmark testing and maximum I/O throughput testing, performed during product release testing phase. However, during operation, these pools may be either under-utilized or over-subscribed. Under-utilization may usually be a result of applications performing less number of I/Os. If these I/O sizes are reasonably large, the throughput can still be reasonably good. Over subscription may usually arise out of spikes in I/O patterns of applications, such as an application/system performing a large number of small sized I/Os. In such situations, the bandwidth utilization and I/O throughput can suffer.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and method for flexible device driver resource allocation is disclosed. In the following description, for purposes of explanation, numerous specific details are set forth in order to provide a thorough understanding of the various embodiments. It will be evident, however, to one skilled in the art that the various embodiments may be practiced without these specific details.

The terms "shared memory resources", "shared memory pools", "shared pool entries", "hardware pools", "hardware interface pools", and "hardware resource pools" are used interchangeably throughout the document. Also, the terms "driver", "interface driver", "device driver" and "interface device driver" are used interchangeably throughout the document. In addition, the terms "pool", and "queue" are used interchangeably throughout the document. Further, the term "resources" in some embodiments refers to a unit of memory.

Figure 1:
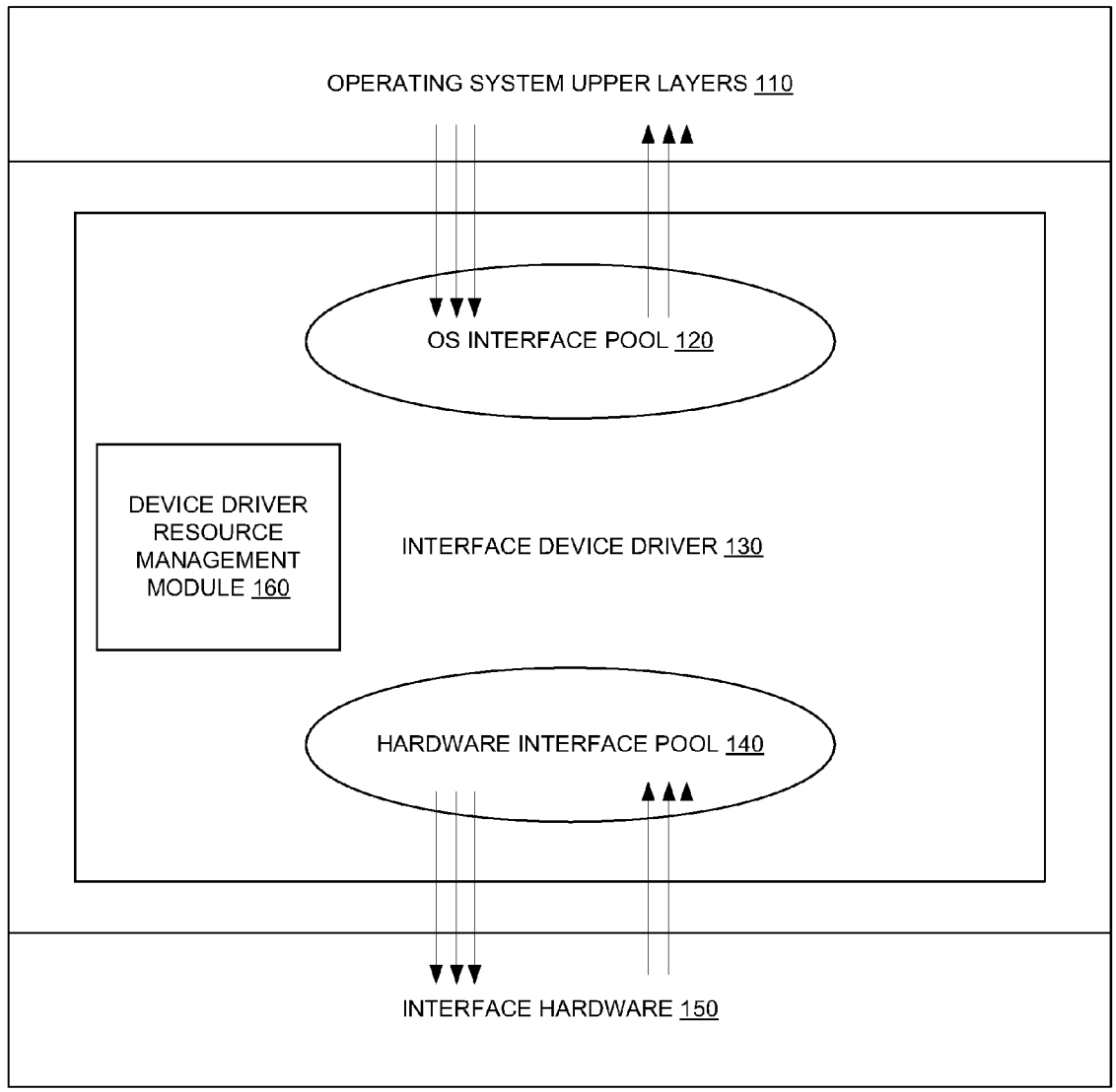
FIG. 1 is a block diagram illustrating a high level architecture of a Fiber Channel (FC) interface device driver, according to one embodiment.

FIG. 1 is a block diagram 100 illustrating a high level architecture of a Fiber Channel (FC) interface device driver, according to one embodiment. Particularly, FIG. 1 illustrates Operating System (OS) upper layers 110, an OS interface pool 120, an interface device driver 130, a hardware interface pool 140, an interface hardware 150 and a device driver resource management module 160.

The operating system upper layers 110 manage and interface incoming I/Os with the interface hardware 150 in a data processing system. The OS interface pool 120 refers to a pool of data structures associated with an Operating System (OS) that enables interaction with other layers of OS kernel. The interface device driver 130 is a software component coupled between the OS upper layers 110 and the interface adapter hardware 150 which enables interaction of the interface hardware 150 with the OS. The hardware interface pool 140 refers to a pool of data structures shared between the interface hardware 150 and the interface device driver 130. In addition, the hardware interface pool 140 enables I/Os to be dispatched to the interface hardware 150 for processing. The device driver resource management module 160 statically allocates hardware resource pools 140 to the interface device driver 130 on a rigid basis during the initialization of the data processing system.

In operation, incoming I/Os from the OS upper layers 110 are enqueued on the OS interface pool 120 of the interface device driver 130 before being dispatched to the interface hardware 150 through the hardware interface pool 140. For example, the interface device driver 130 dispatches I/Os for processing (e.g., fetching the data from a location to write on a disk based on the I/O request) to the interface hardware 150 through the hardware interface pool 140. The interface hardware 150 processes I/Os from the OS upper layers 110.

In some embodiments, the interface device driver 130 handles I/O completions from the interface hardware 150 through the hardware interface pool 140 and issues new I/Os to the interface hardware 150 from the OS upper layers 110. In these embodiments, the interface driver 130 accepts I/O requests from the OS upper layers 110 into the OS interface pool 120 and reports back completion of I/Os by the interface hardware 150 to the OS upper layers 110.

During this operation, the device driver resource management module 160 dynamically alters the allocated hardware resource pools 140 to the device drivers 130 based on parameters associated with utilization of the allocated hardware resource pools 140 during run-time for better efficiency of the data processing system. For example, the parameters associated with the utilization of the allocated hardware resource pools 140 include hardware throughput, an average hardware pool utilization and number of I/Os waiting at OS interface queue 120.

In some embodiments, the device driver resource management module 160 determines whether the hardware throughput during the run-time is less than or equal to a hardware throughput threshold value. In these embodiments, the device driver resource management module 160 determines whether the average number of I/Os waiting at the OS interface queue 120 during the run-time is greater than or equal to a predetermined number of waiting I/Os threshold value if the hardware throughput is less than or equal to the capability of the interface hardware 150.

In one embodiment, the device driver resource management module 160 dynamically increases the allocated hardware resource pools 140 to the device drivers 130 if the average number of I/Os waiting at the OS interface queue 120 during the run-time is greater than or equal to the predetermined number of waiting I/Os threshold value.

In an alternate embodiment, the device driver resource management module 160 determines whether the average hardware pool utilization during the run-time is below or equal to the predetermined hardware pool utilization threshold value if the average number of I/Os waiting at the OS interface queue 120 during run-time is not greater than or equal to the predetermined number of waiting I/Os threshold value and dynamically decreases the allocated hardware resource pools 140 to the device drivers 130 if the device driver resource management module 160 determines that the average hardware pool utilization during the run-time is below or equal to the predetermined hardware pool utilization threshold value.

Further, if the device driver resource management module 160 determines that the average hardware pool utilization during the run-time is not below or equal to the predetermined hardware pool utilization threshold value, the driver resource management module 160 repeats determining whether the hardware throughput during the run-time is less than or equal to the hardware throughput threshold value.

In some embodiments, if the device driver resource management module 160 determines that the hardware throughput during the run-time is not less than or equal to the hardware throughput threshold value then the device driver resource management module 160 determines whether the average number of I/Os waiting at the OS interface queue 120 during the run-time is greater than or equal to the predetermined number of waiting I/Os threshold value.

Further, the device driver management module 160 informs the OS layer 110 to regulate I/Os, if the average number of I/Os waiting at the OS interface queue 120 during the run-time is greater than or equal to the predetermined number of waiting I/Os threshold value. If the average number of I/Os waiting at the OS interface queue 120 during the run-time is not greater than or equal to the predetermined number of waiting I/Os threshold value, the device driver management module 160 repeats determining whether the hardware throughput during the run-time is less than or equal to the hardware throughput threshold value. For example, the OS layer 110 may be informed to throttle down the I/Os if the average number of I/Os waiting at the OS interface queue 120 during the run-time is greater than or equal to the predetermined number of waiting I/Os threshold value.

It can be noted that the device driver management module 160 of the device driver 130 utilizes hardware throughput achieved over a period of time (e.g., through an observation window) in conjunction with the average hardware pool utilization and the number of I/Os waiting at the OS interface queue 120 (e.g., waiting to get into the hardware interface pool 140) to determine whether the allocated hardware resource pools 140 require alteration or not.

Figure 2:
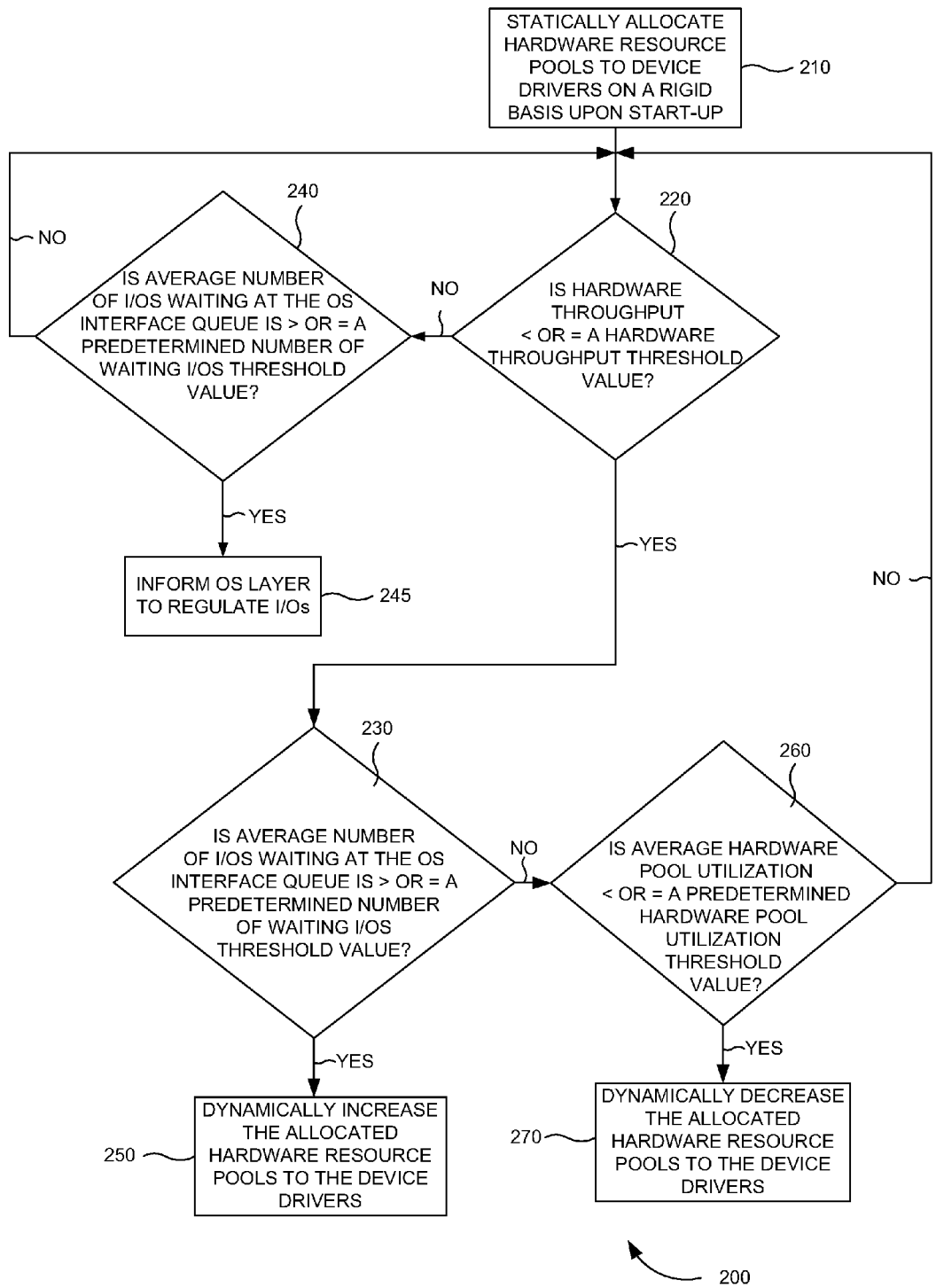
FIG. 2 is a process flow of dynamically allocating device driver resources, according to one embodiment.

FIG. 2 is a process flow 200 of dynamically allocating device driver resources, according to one embodiment. In operation 210, hardware resource pools 140 are statically allocated to device drivers 130 on a rigid basis during initialization (i.e., startup) of a data processing system. In some embodiments, the allocated hardware resource pools 140 to the device drivers 130 are dynamically altered based on parameters associated with utilization of the allocated hardware resource pools 140 during run-time. The parameters associated with utilization of the allocated hardware resource pools 140 during the run-time include hardware throughput, an average hardware pool utilization and number of I/Os waiting at OS interface queue 120.

In operation 220, it is determined whether the hardware throughput during the run-time is less than or equal to a hardware throughput threshold value. If the hardware throughput is less than or equal to the hardware throughput threshold value, the process 200 goes to operation 230 and determines whether the average number of I/Os waiting at the OS interface queue 120 during the run-time is greater than or equal to a predetermined number of waiting I/Os threshold value, else the process 200 is routed to operation 240.

In operation 240, it is determined whether the average number of I/Os waiting at the OS interface queue 120 during the run-time is greater than or equal to the predetermined number of waiting I/Os threshold value. If the average number of I/Os waiting at the OS interface queue 120 during the run-time is greater than or equal to the predetermined number of waiting I/Os threshold value, then an OS layer 110 is informed to regulate the I/Os in operation 245, else the process 200 is routed back to repeat operation 220. For example, the OS layer 110 may be informed to throttle down the I/Os if the average number of I/Os waiting at the OS interface queue 120 during the run-time is greater than or equal to the predetermined number of waiting I/Os threshold value.

In operation 250, if the average number of I/Os waiting at the OS interface queue 120 during the run-time is greater or equal to the predetermined number of waiting I/Os threshold value, the allocated hardware resource pools 140 to the device drivers 130 are dynamically increased. Else, the process goes to operation 260 and determines whether the average hardware pool utilization during the run-time is below or equal to a predetermined hardware pool utilization threshold value. For example, dynamically increasing the allocated hardware resource pools 140 to the device drivers 130 helps in improving overall system throughput.

If in operation 260, it is determined that the average hardware pool utilization during the run-time is below or equal to the predetermined hardware pool utilization threshold value, then the process 200 goes to operation 270 and dynamically decreases the allocated hardware resource pools 140 to the device drivers 130, else the process 200 is routed back to repeat the operation 220. For example, dynamically decreasing the allocated hardware resource pools 140 to the device drivers 130 may help the device drivers 130 in releasing extra resources back to the OS layers 110.

Further, from the above-described process 200, it can be noted that, the allocated hardware resource pools 140 is decreased dynamically if the average hardware pool utilization is below the predetermined hardware pool utilization threshold value and if the hardware throughput is below the capability of the hardware (i.e., below the hardware throughput threshold value).

Alternatively, the allocated hardware resource pools 140 is increased dynamically if the average number of I/Os waiting at the OS interface queue 120 exceeds the predetermined number of waiting I/Os threshold value and if the hardware throughput is below the capability of the hardware.

In some embodiments, the predetermined hardware pool utilization threshold value and the predetermined number of waiting I/Os threshold value are based on parameters selected from the group consisting of a percentage of a current hardware pool size and a ratio of a current hardware pool size.

In one embodiment, firstly, the device drivers 130 are suspended, then the allocated hardware resource pools 140 to the device drivers 130 are dynamically altered based on the average hardware pool utilization and the number of I/Os waiting at OS interface queue 120 and the device drivers 130 are resumed. In another embodiment, current pending I/Os are drained first and then the allocated hardware resource pools 140 to the device drivers 130 are dynamically altered based on the average hardware pool utilization and the number of I/Os waiting at the OS interface queue 120 prior to resuming new I/Os.

In some embodiments, the allocated hardware resource pools 140 are dynamically increased till the OS interface queue 120 length drops to acceptable range. In these embodiments, dynamically increasing the allocated hardware resource pools 140 is stopped even if the I/O throughput is not near saturation. It can be noted that the dynamically increasing of the allocated hardware resource pools 140 may not yield further benefits as all I/Os are getting serviced immediately. Those skilled in the art can understand that the allocated hardware resource pools 140 to the device drivers 130 is dynamically decreased when I/O load reduces (i.e., when the average hardware pool utilization during the run-time is below or equal to the predetermined hardware pool utilization threshold value), i.e., when system performance is not impacted due to fewer entries in the hardware resource pools 140.

Figure 3:
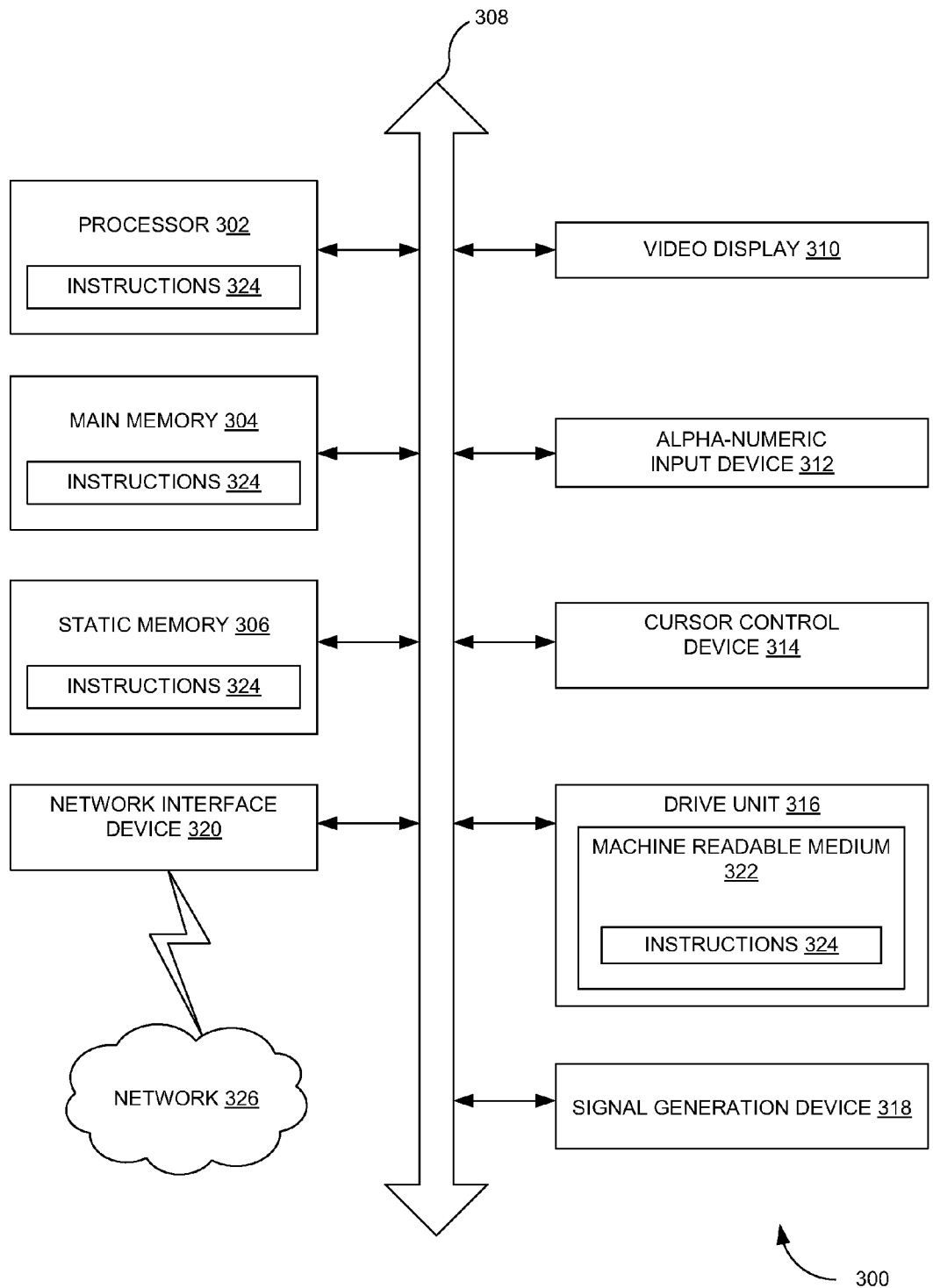
FIG. 3 is a diagrammatic system view of a data processing system in which any of the embodiments disclosed herein may be performed, according to one embodiment.

FIG. 3 is a diagrammatic system view 300 of a data processing system in which any of the embodiments disclosed herein may be performed, according to one embodiment. Particularly, the diagrammatic system view of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324 and a network 326.

The diagrammatic system view 300 may indicate a personal computer and/or a data processing system in which one or more operations disclosed herein are performed. The processor 302 may be a microprocessor, a state machine, an application specific integrated circuit, a field programmable gate array, etc. The main memory 304 may be a dynamic random access memory and/or a primary memory of a computer system. The static memory 306 may be a hard drive, a flash drive, and/or other memory information associated with the data processing system.

The bus 308 may be an interconnection between various circuits and/or structures of the data processing system. The video display 310 may provide graphical representation of information on the data processing system. The alpha-numeric input device 312 may be a keypad, keyboard and/or any other input device of text (e.g., a special device to aid the physically handicapped). The cursor control device 314 may be a pointing device such as a mouse. The drive unit 316 may be a hard drive, a storage system, and/or other longer term storage subsystem.

The signal generation device 318 may be a BIOS and/or a functional operating system of the data processing system. The network interface device 320 may perform interface functions (e.g., code conversion, protocol conversion, and/or buffering) required for communications to and from the network 326 between a number of independent devices (e.g., of varying protocols). The machine readable medium 322 may provide instructions on which any of the methods disclosed herein may be performed. The instructions 324 may provide source code and/or data code to the processor 302 to enable any one or more operations disclosed herein.

For example, a storage medium having instructions, that when executed by a computing platform executes a method of dynamically allocating device driver resources, includes statically allocating hardware resource pools 140 to device drivers 130 on a rigid basis during initialization of the data processing system, and dynamically altering the allocated hardware resource pools 140 to the device drivers 130 based on parameters associated with utilization of the allocated hardware resource pools 140 during run-time. For example, the parameters associated with the utilization of the allocated hardware resource pools 140 are selected from the group consisting of hardware throughput, an average hardware pool utilization and number of I/Os waiting at OS interface queue 120.

Dynamically altering the allocated hardware resource pools 140 includes determining whether the hardware throughput during the run-time is less than or equal to the hardware throughput threshold value, if so, determining whether the average number of I/Os waiting at the OS interface queue 120 during the run-time is greater than or equal to a predetermined number of waiting I/Os threshold value, and if so, dynamically increasing the allocated hardware resource pools 140 to the device drivers 130.

The storage medium may have instructions to determine whether the average number of I/Os waiting at the OS interface queue 120 during the run-time is greater than or equal to the predetermined number of waiting I/Os threshold value if the hardware throughput during the run-time is not less than or equal to the hardware throughput threshold value, if so, to inform an OS layer 110 to regulate I/Os, and if not, to repeat determining whether the hardware throughput during the run-time is less than or equal to the hardware throughput threshold value.

Further, the storage medium may have instructions to determine whether the average hardware pool utilization during the run-time is below or equal to a predetermined hardware pool utilization threshold value if the average number of I/Os waiting at the OS interface queue 120 during the run-time is not greater than or equal to the predetermined number of waiting I/Os threshold value, if so, to dynamically decrease the allocated hardware resource pools 140 to the device drivers 130, and if not, to repeat determining whether the hardware throughput during the run-time is less than or equal to the hardware throughput threshold value.

Furthermore, a computer system includes a processing unit and a memory coupled to the processor. The memory has code stored therein for dynamically altering device driver resources. The code causes the processor to statically allocate hardware resource pools 140 to device drivers 130 on a rigid basis during initialization of the data processing system, and dynamically alter the allocated hardware resource pools 140 to the device drivers 130 based on parameters associated with utilization of the allocated hardware resource pools 140 during run-time.

The above-described technique improves I/O throughput for each connected device interface adapter 130. Further, the above technique releases any unused shared memory resources from the device interface adapters 130. The above process dynamically matches bandwidth utilization with resource allocation. Also, the above process dynamically increases or decreases shared memory resources to device drivers 130 with minimal disruption to the I/O throughput by including thresholds to avoid frequent increase or decrease in shared memory resource allocation. Furthermore, the above technique allocates shared memory pools (i.e., the hardware interface pool 140) to each device interface adapter 130 independently during initialization and later dynamically grows or reduces the shared memory pools 140 based on the usage to improve I/O throughput performance.

In the above-described technique, the device drivers 130 tune themselves to deliver improved performance from the hardware resource pools 140. Further, the above technique alters the hardware resource pools 140 without adversely impacting system performance. The above technique has the ability to alter (e.g., increase) hardware resource pools 140 when system performance is expected to improve. Similarly, the above technique has the ability to decrease and free up hardware resource pools 140 when system performance is not impacted due to fewer entries in the hardware resource pools 140.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of dynamically allocating device driver resources from system resources in a data processing system, comprising:
   statically allocating hardware resource pools to device drivers on a rigid basis during initialization of the data processing system; and
   dynamically altering the allocated hardware resource pools to the device drivers based on parameters associated with utilization of the allocated hardware resource pools during run-time, wherein dynamically altering the allocated hardware resource pools comprises:
   determining whether a hardware throughput during the run-time is less than or equal to a hardware throughput threshold value;
   if so, determining whether a number of input/outputs (I/Os) waiting at an operating system (OS) interface queue during the run-time is greater than or equal to a predetermined number of waiting I/Os threshold value; and
   if the number of I/Os waiting at the OS interface queue during the run-time is greater than or equal to the predetermined number, dynamically increasing the allocated hardware resource pools to the device drivers.

2. The method of claim 1, further comprising:
   if the hardware throughput during the run-time is not less than or equal to the hardware throughput threshold value, then determining whether the number of I/Os waiting at the OS interface queue during the run-time is greater than or equal to the predetermined number of waiting I/Os threshold value;
   if so, informing an OS layer to regulate I/Os.

3. The method of claim 1, further comprising:
   if the number of I/Os waiting at the OS interface queue during the run-time is not greater than or equal to the predetermined number of waiting I/Os threshold value, then determining whether an average hardware pool utilization during the run-time is below or equal to a predetermined hardware pool utilization threshold value;
   if so, dynamically decreasing the allocated hardware resource pools to the device drivers.

4. The method of claim 3, wherein the predetermined hardware pool utilization threshold value is based on parameters selected from the group consisting of percentage of current hardware pool size and ratio of current hardware pool size.

5. The method of claim 3, wherein the predetermined number of waiting I/Os threshold value is based on parameters selected from the group consisting of percentage of hardware pool size and ratio of current hardware pool size.

6. The method of claim 1, wherein dynamically altering the allocated hardware resource pools to the device drivers comprises:
   suspending the device drivers;
   dynamically altering the allocated hardware resource pools to the device drivers while the device drivers are suspended; and
   resuming the device drivers.

7. The method of claim 1, wherein dynamically altering the allocated hardware resource pools to the device drivers comprises:
   waiting until current pending I/Os are drained;
   dynamically altering the allocated hardware resource pools to the device drivers after the current pending I/Os are drained; and
   resuming new I/Os after the dynamic altering of the allocated hardware resource pools.

8. The method of claim 1, wherein the number of I/Os waiting at the OS interface queue is an average number of I/Os waiting at the OS interface queue.

9. An article, comprising:
   a non-transitory storage medium having instructions that when executed by a computer cause the computer to:
   statically allocate hardware resource pools to device drivers on a rigid basis during initialization of the data processing system; and
   dynamically alter at least one of the allocated hardware resource pools to the corresponding device driver during run-time, wherein the dynamically altering comprises:
   determining whether a hardware throughput during the run-time is less than or equal to a hardware throughput threshold value;
   if so, determining whether a number of input/outputs (I/Os) waiting at an operating system (OS) interface queue during the run-time is greater than or equal to a predetermined number; and
   if the number of I/Os waiting at the OS interface queue during the run-time is greater than or equal to the predetermined number, dynamically increasing the at least one allocated hardware resource pool to the corresponding device driver.

10. The article of claim 9, wherein the instructions when executed cause the computer to further:
if the hardware throughput during the run-time is not less than or equal to the hardware throughput threshold value, then determine whether the number of I/Os waiting at the OS interface queue during the run-time is greater than or equal to the predetermined number;
if so, inform an OS layer to regulate I/Os.

11. The article of claim 9, wherein the instructions when executed cause the computer to further:
if the number of I/Os waiting at the OS interface queue during the run-time is not greater than or equal to the predetermined number, then determine whether a hardware pool utilization during the run-time is below or equal to a predetermined hardware pool utilization threshold value;
if so, dynamically decrease the at least one allocated hardware resource pool to the corresponding device driver.

12. The article of claim 9, wherein the number of I/Os waiting at the OS interface queue is an average number of I/Os waiting at the OS interface queue.

13. A system, comprising:
at least one processor;
a plurality of device drivers executable on the at least one processor, wherein each device driver is coupled between an operating system (OS) interface pool and associated interface hardware, wherein at least a given one of the plurality of device drivers comprises:
a device driver resource management module for statically allocating a hardware resource pool to the given device driver on a rigid basis during initialization, and wherein the device driver resource management module is configured to dynamically alter the allocated hardware resource pool to the given device driver during run-time, the dynamically altering comprising:
determining whether a hardware throughput of hardware associated with the given device driver is below a throughput threshold during run-time;
in response to the hardware throughput being below the throughput threshold, determining whether a number of input/outputs (I/Os) at an operating system (OS) interface queue exceeds a predetermined number; and
in response to determining that the number of I/Os at the OS interface queue exceeds the predetermined number, dynamically increasing the allocated hardware resource pool during the run-time.

14. The system of claim 13, wherein if the device driver resource management module determines that the number of I/Os at the OS interface queue during the run-time exceeds the predetermined number in response to the hardware throughput during the run-time not being below the throughput threshold, the device driver management module is configured to inform an OS layer to regulate I/Os.

15. The system of claim 13, wherein if the device driver resource management module determines that an average hardware pool utilization during the run-time is below or equal to a predetermined hardware pool utilization threshold in response to the number of I/Os at the OS interface queue during the run-time not exceeding the predetermined number the device driver resource management module is configured to dynamically decrease the allocated hardware resource pool to the given device driver.

16. The system of claim 13, wherein the number of I/Os at the OS interface queue is an average number of I/Os at the OS interface queue.

* * * * *